(12) United States Patent
Peng et al.

(10) Patent No.: US 9,264,286 B2
(45) Date of Patent: Feb. 16, 2016

(54) METHOD OF PLAYING CONTENT AND DEVICE FOR PLAYING CONTENT

(75) Inventors: Yang Peng, Shanghai (CN); Declan Patrick Kelly, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 719 days.

(21) Appl. No.: 10/582,568

(22) PCT Filed: Dec. 2, 2004

(86) PCT No.: PCT/IB2004/052634
§ 371 (c)(1),
(2), (4) Date: Jun. 12, 2006

(87) PCT Pub. No.: WO2005/060213
PCT Pub. Date: Jun. 30, 2005

(65) Prior Publication Data
US 2007/0100966 A1 May 3, 2007

(30) Foreign Application Priority Data
Dec. 15, 2003 (CN) .......................... 2003 1 0123353

(51) Int. Cl.
*H04L 29/06* (2006.01)
*H04L 29/08* (2006.01)
*H04N 21/24* (2011.01)
(Continued)

(52) U.S. Cl.
CPC .......... *H04L 29/06027* (2013.01); *H04L 65/80* (2013.01); *H04L 67/02* (2013.01); *H04L 47/2416* (2013.01); *H04N 21/2387* (2013.01);
(Continued)

(58) Field of Classification Search
USPC ................. 709/231, 250, 203–205, 217–222, 709/246–247, 200; 725/109, 37–40, 78, 725/133–134; 715/203, 716–726, 735–736, 715/744–749, 808–811, 825, 864–866; 369/30.01–30.09, 30.18–30.3, 369/47.28–47.39, 53.1, 53.37, 53.45; 386/109–113, 123–125, 240–248, 386/343–352
See application file for complete search history.

(56) References Cited

U.S. PATENT DOCUMENTS 6,253,246 B1   6/2001   Nakatsuyama
6,349,197 B1   2/2002   Oestreich
(Continued)

FOREIGN PATENT DOCUMENTS

JP   11127150 A   5/1999
JP   11205390 A   7/1999
(Continued)

*Primary Examiner* — Greg C Bengzon

(57) ABSTRACT

The invention relates to a method and device for playing a content. The method comprising: reading a pre-stored content which include information relevant to a downloaded content; detecting available bandwidth; sending a request for downloading the downloaded content according to the information relevant to the downloaded content, wherein the request includes the information of the bandwidth; receiving the downloaded content according with the detected bandwidth; and playing the downloaded content combined with the pre-stored content. Because said method and device according to the present invention adopts the automatic real-time detection for the current usable bandwidth of the network playback device connected to, and it changes the quality of content requiring downloading, seamless playback can be realized, while avoiding the trouble due to the quality selection by the user himself.

20 Claims, 5 Drawing Sheets

(51) Int. Cl.
 *H04L 12/853* (2013.01)
 *H04N 21/2387* (2011.01)
 *H04N 21/432* (2011.01)

(52) U.S. Cl.
 CPC ........ *H04N 21/2401* (2013.01); *H04N 21/2402* (2013.01); *H04N 21/4325* (2013.01)

(56) References Cited

U.S. PATENT DOCUMENTS

| | | | | |
|---|---|---|---|---|
| 7,209,874 | B2* | 4/2007 | Salmonsen | 703/23 |
| 7,237,254 | B1* | 6/2007 | Omoigui | 725/94 |
| 7,313,809 | B1* | 12/2007 | Mohan et al. | 725/109 |
| 7,330,875 | B1* | 2/2008 | Parasnis et al. | 709/204 |
| 7,503,059 | B1* | 3/2009 | Rothschild | 725/113 |
| 7,610,604 | B2* | 10/2009 | Lee ............ H04N 1/4325 386/200 |
| 8,244,889 | B1* | 8/2012 | Ogdon ............ H04L 12/1813 709/229 |
| 8,407,358 | B1* | 3/2013 | Hess | 709/231 |
| 9,143,814 | B2* | 9/2015 | Wolfe ............ H04N 21/234309 |
| 2001/0044835 | A1 | 11/2001 | Schober et al. | |
| 2002/0116518 | A1* | 8/2002 | Silen et al. | 709/231 |
| 2003/0041123 | A1* | 2/2003 | Sato et al. | 709/219 |
| 2003/0081943 | A1* | 5/2003 | Kim et al. | 386/125 |
| 2003/0225568 | A1 | 12/2003 | Salmonsen | |
| 2003/0229679 | A1* | 12/2003 | Yoo et al. | 709/217 |
| 2004/0080528 | A1* | 4/2004 | Rand ............ G06F 17/30017 715/738 |
| 2004/0088371 | A1 | 5/2004 | Hiramatsu et al. | |
| 2004/0098466 | A1* | 5/2004 | Yoon ............ H04L 29/06027 709/217 |
| 2004/0103445 | A1* | 5/2004 | Yoon ............ G11B 27/10 725/142 |
| 2004/0133923 | A1* | 7/2004 | Watson et al. | 725/134 |
| 2004/0181816 | A1* | 9/2004 | Kim et al. | 725/138 |
| 2004/0234253 | A1* | 11/2004 | Mahdavi | 386/125 |
| 2004/0252983 | A1* | 12/2004 | Jung ............ G11B 20/10527 386/240 |
| 2004/0267790 | A1* | 12/2004 | Pak et al. | 707/100 |
| 2005/0063404 | A1* | 3/2005 | Karaoguz et al. | 370/418 |
| 2005/0120351 | A1* | 6/2005 | de Bonet | 718/107 |
| 2005/0132021 | A1* | 6/2005 | Mehr | 709/217 |
| 2005/0165911 | A1* | 7/2005 | Homiller | 709/219 |
| 2005/0204398 | A1* | 9/2005 | Ryal | 725/112 |
| 2005/0232577 | A1* | 10/2005 | Green | 386/46 |
| 2006/0002681 | A1* | 1/2006 | Spilo et al. | 386/46 |
| 2006/0026294 | A1* | 2/2006 | Virdi et al. | 709/232 |
| 2006/0072596 | A1* | 4/2006 | Spilo et al. | 370/412 |
| 2006/0075446 | A1* | 4/2006 | Klemets et al. | 725/100 |
| 2006/0280437 | A1* | 12/2006 | Logan et al. | 386/94 |
| 2007/0056013 | A1* | 3/2007 | Duncan | 725/134 |
| 2007/0067315 | A1* | 3/2007 | Hegde et al. | 707/10 |
| 2007/0101375 | A1* | 5/2007 | Haberman | 725/86 |
| 2007/0168966 | A1* | 7/2007 | Pessolano et al. | 717/122 |
| 2007/0185977 | A1* | 8/2007 | Sato et al. | 709/219 |

FOREIGN PATENT DOCUMENTS

| | | |
|---|---|---|
| JP | 2002083463 A | 3/2002 |
| JP | 2003196200 A | 7/2003 |
| JP | 2003203027 A | 7/2003 |
| WO | 0171568 A2 | 9/2001 |

* cited by examiner

METHOD OF PLAYING CONTENT AND DEVICE FOR PLAYING CONTENT

BACKGROUND OF THE INVENTION

The invention relates to a method and device for playing content, especially relates to a method and device for detecting the available bandwidth of a network the playing device connected to, downloading content of appropriate quality and playing them.

With the fast development of optical disk and OPTICAL DISK playback technology, more and more content are stored in the network server in order to be downloaded in the player during the playback process and then cooperate with the player in the playback.

The downloaded content can be applications, audio and subtitles. The application is written by JAVA language or other programming languages. The applications written by JAVA language are: advertisement, game, animation and executable applications for controlling the playback process of OPTICAL DISK, which are written by JAVA language.

It is widely used in many OPTICAL DISKs and the corresponding players to store the application, additional audio and subtitles in the network server, then download them to the player anytime for cooperating in the OPTICAL DISK playback, eg. Blue-Disc and corresponding player, eDVD (Enhanced DVD) and corresponding player.

At present, a dialog box offering options to the user usually can be seen in the screen when downloading content from network servers to cooperate in OPTICAL DISK playback. This dialog box requires the user to select a relevant bandwidth (or throughput) based on the current network connection type (dialing-up, ISDN, broadband connection, etc), then it sends the bandwidth option to the network server to request to download information, the quality (bit rate) of which is adaptive to the bandwidth, so as to use the information of appropriate quality to cooperate seamlessly the OPTICAL DISK playback. For example, if selecting the dial-up connection, then the available network connection bandwidth will be relatively small. At this time, the user may select to download audio information of quality that is adaptive to the current bandwidth to cooperate in the OPTICAL DISK playback. If the user is connecting to the broadband network, then the bandwidth of the network connection will be relatively large, thus the user can select to download the audio, animation or game of quality that is adaptive to the current bandwidth to cooperate in the OPTICAL DISK playback.

However, whether the dial-up or broadband connection is selected, both of the network connection bandwidths change dynamically. According to the current using connection type, the user selects a bandwidth to download the information of quality corresponding therewith. However the network connection bandwidth may vary, for example, because more (or less) devices or users connect to the network, the network connection bandwidth becomes more (or less), as a result, the selected quality is not adaptive to the network connection bandwidth, so it is hard to utilize fully the current network connection bandwidth or implement the seamless OPTICAL DISK playback.

Furthermore, the user should know a great deal of technology during the above selecting process, such as what is the maximum bandwidth in dial-up connection and broadband connection. Thus, the user may make an appropriate quality selection to implement seamless playback. However, in fact, not all users know the above technology. If not, he may select the wrong option.

For example, although the user may download the content with better quality to cooperate in the OPTICAL DISK playback according to the current actual bandwidth, because the selected bandwidth is less than the actual bandwidth, it results in that he downloads the content with worse quality to cooperate in the OPTICAL DISK playback. So, it will bring the user the worse playback affecting the user's interests for viewing the OPTICAL DISK information. On the other hand, if in terms of the current actual bandwidth, the user can only download the content of worse quality to cooperate in the OPTICAL DISK playback, but the selected bandwidth is greater than the actual one, the result is that he downloads content with better quality than adaptive to the current bandwidth to cooperate in the OPTICAL DISK playback, so it will result in that the downloaded content are delayed from the content read direct from the OPTICAL DISK easily, so it is hard to achieve the synchronous playback.

Therefore, an improved method and device for downloading content is needed to avoid the above drawbacks.

SUMMERY OF THE INVENTION

The invention provides a method and device for detecting dynamically the network connection bandwidth in real-time and playing the content.

Said method for playing a content according to the present invention, comprising the steps: reading a pre-stored content which include information relevant to a downloaded content; detecting available bandwidth; sending a request for downloading the downloaded content according to the information relevant to the downloaded content, wherein the request includes the information of the bandwidth; receiving the downloaded content according with the detected bandwidth; and playing the downloaded content combined with the pre-stored content.

Another method for playing a content according to the present invention comprising steps of: reading a pre-stored content which include information relevant to a downloaded content; detecting available bandwidth; selecting relevant quality of the downloaded content according to the detected bandwidth information and the information relevant to the downloaded content; sending a request for downloading the downloaded content according to the information relevant to the downloaded content, wherein the request includes the relevant quality; receiving the downloaded content according to the relevant quality; and playing the downloaded content combined with the pre-stored content.

A device for playing a content according to the present invention comprising: reading means for reading a pre-stored content which include information relevant to a downloaded content; detecting means for detecting available bandwidth; sending means for sending a request for downloading the downloaded content according to the information relevant to the downloaded content, wherein the request includes the information of the bandwidth; receiving means for receiving the downloaded content according with the detected bandwidth; and playing means for playing the downloaded content combined with the pre-stored content.

Because said method and device according to the present invention adopts the automatic real-time detection for the current usable bandwidth of the network playback device connected to, and it changes the quality of content requiring downloading, seamless playback can be realized, while avoiding the trouble due to the quality selection by the user himself.

The other objects and advantages of the invention as well as the complete understanding thereof will be apparent and clear with reference to the following description and the claims, in junction with the accompanying drawings.

BRIEF DESCRIPTION OF THE DRAWINGS

The present invention will be further illustrated by examples and drawings.

The similar or corresponding feature and function are denoted by the same reference in all the drawings above.

DETAILED DESCRIPTIONS OF THE PREFERRED EMBODIMENTS

Figure 1:
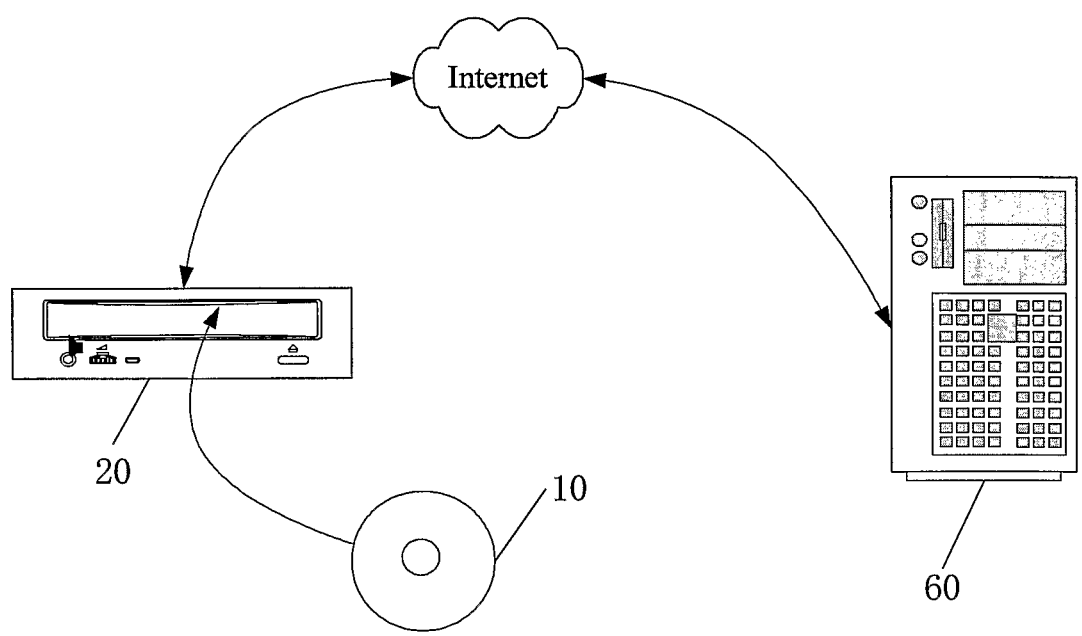
FIG. 1 is a schematic view of the structure for an exemplary embodiment of OPTICAL DISK playing system in accordance with the invention.

FIG. 1 is a schematic view of the structure for an exemplary embodiment of OPTICAL DISK playing system in accordance with the invention. The OPTICAL DISK playing system includes a OPTICAL DISK 10, a player 20 for playing OPTICAL DISK and a network server 60, wherein the player 20 is connected with the network server 60 via Internet. The player 20 downloads information from the network server 60, and its quality (or bit rate) corresponds to the current network connection bandwidth (or throughput) so that it can be played combined with the information stored in the OPTICAL DISK 10.

Figure 2:
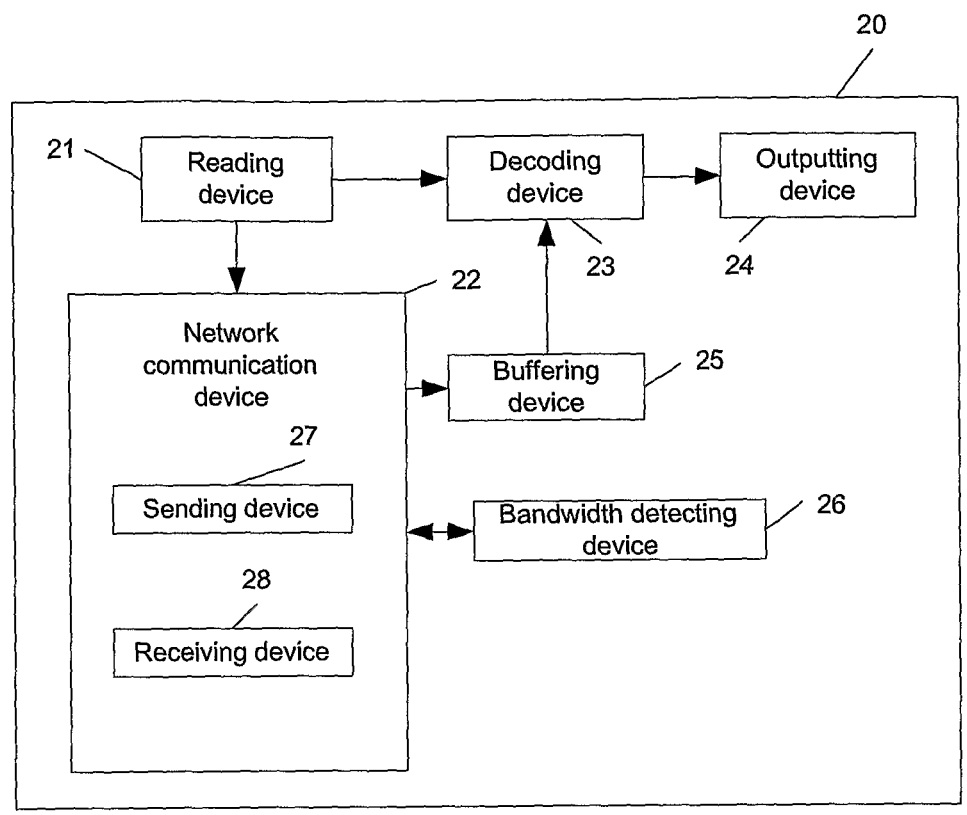
FIG. 2 is a schematic view of the structure for the first exemplary embodiment of the player shown in the FIG. 1.

FIG. 2 is a schematic view of the structure for the first exemplary embodiment of the player shown in the FIG. 1. The player 20 contains an reading device 21, a network communication device 22, a decoding device 23, an outputting device 24, a buffering device 25 and a bandwidth detecting device 26. The other conventional components of the player 20 are not shown in the FIG. 1.

The reading device 21 is used for reading out OPTICAL DISK information. Information read out by the reading device 21 comprises the information stored in the OPTICAL DISK and needed playing, the ID of OPTICAL DISK (OPTICAL DISK identification or number) and the URL corresponding to the content requiring downloading. In the player, the information which is stored in OPTICAL DISK and to be played is delivered directly to the decoding device 230, while the ID of OPTICAL DISK and the URL corresponding to the content requiring downloading are delivered to the network communication device 22, including some auxiliary information such as ads, game, animation, audio and subtitles etc for cooperating in OPTICAL DISK playback.

The bandwidth detecting device 26 is used for detecting the connection bandwidth between the player 20 and the network server 30 in real-time, and sending the detected network connection bandwidth to the network communication device 22. When the player is working, the bandwidth detecting device 26 calculates the current network connection bandwidth according to the available information sent from the network server to the network communication device 22 per second. Because those information downloaded via network is usually inputted to the buffering device 25 first and then played, the current network connection bandwidth can be calculated according to the available information coming into the buffering device 25 per second. The function of bandwidth detecting device 26 can be implemented via a processor in the conventional OPTICAL DISK player.

The network communication device 22 is used for receiving the ID of OPTICAL DISK and the URL for downloading content sent by reading device 21, and also receiving the current network connection bandwidth sent by the bandwidth detecting device 26. The network communication device 22 contains the sending device 27 and the receiving device 28. The sending device 27 is used for sending downloading requests and the receiving device 28 is used for receiving the information relevant to the downloading request. The sent downloading request contains the URL of the content needed to download, the ID of OPTICAL DISK and the current network connection bandwidth information. According to the first embodiment of the invention, the network communication 22 sends the changed bandwidth information and downloading requests to the network server 60 when the bandwidth is changing.

After said downloading request is sent to the network server, the network server selects a quality adaptive to the current bandwidth from quality options of the content requiring downloading on the basis of the current network bandwidth, where the above selecting process can be implemented as follow: the information requiring downloading is uploaded onto the network server by OPTICAL DISK content provider or vendors permitted by OPTICAL DISK content providers, and each content requiring downloading corresponds to one quality selecting menu which includes different quality options.

For example, the content requiring downloading and stored in the network server is the director annotation, thus the corresponding menu includes the following options: A, using the audio with very high quality to express the director annotation, at the bit rate of 256 Kbps; B, using the audio with very poor quality to express the director annotation, at the bit rate of 64 Kbps; C, using the subtitles based on text to express the director annotation, at the bit rate of 20 Kbps, so that the network server may select automatically from the menu to download information in conformance with the current bandwidth to implement the seamless playback when receiving the current network connection bandwidth.

The buffering device 25 is used for buffering and receiving the information downloaded by the receiving device 28 in the network communication device 22. The downloaded content outputted by the buffering device 25 and the OPTICAL DISK information read out by the reading device 21 are decoded by the decoding device 23 at the time that the player is working, then the outputting device 24 outputs the received OPTICAL DISK information and downloaded content synchronously.

In the first embodiment, the functions of every components of the player 20 can be controlled by JAVA application combined with a processor (not shown).

Through the real-time detection of bandwidth by the player 20, the network server 60 can select, from the quality selecting menu of content requiring downloading, the quality for downloading information in conformance with the bandwidth according to the detected bandwidth, and send the content requiring downloading to the player with the selected quality. According to the present invention, the player may adjust the quality for downloading information in real-time according to the network connection condition to improve playing efficiency.

Figure 3:
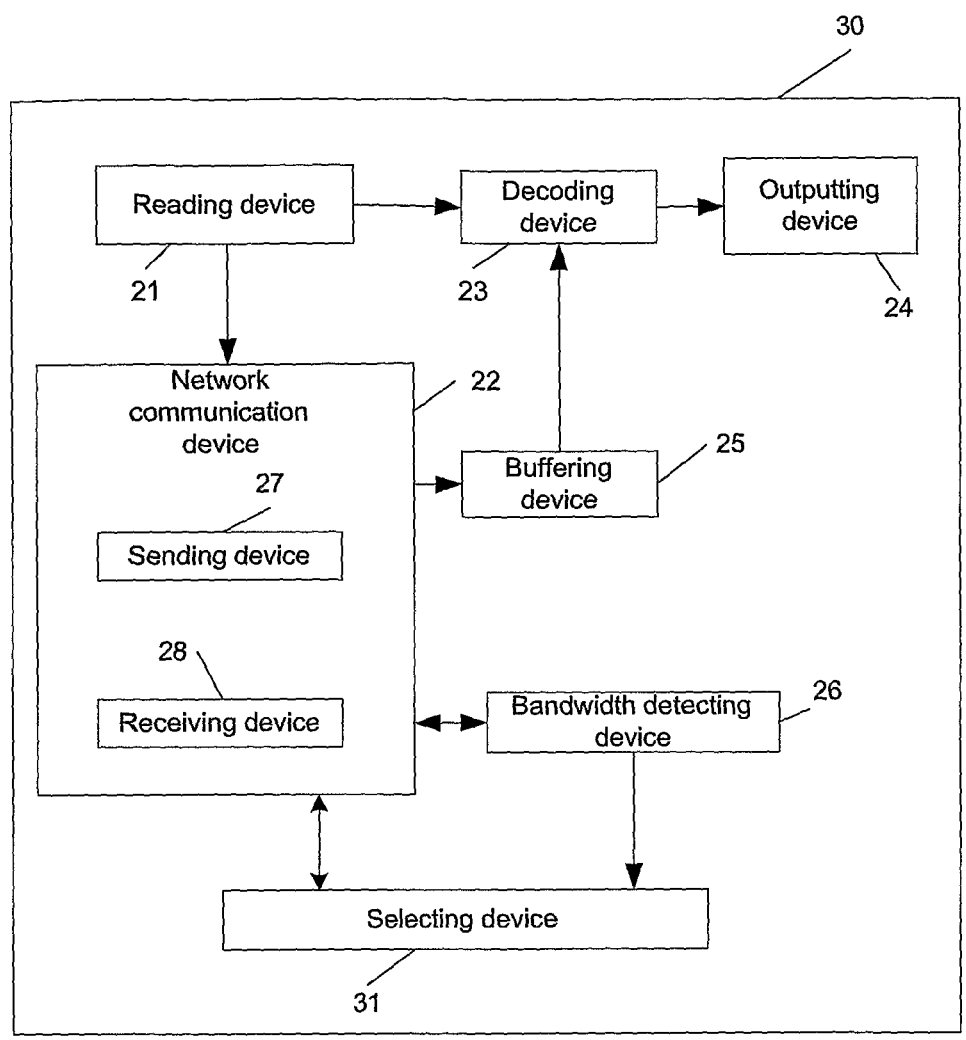
FIG. 3 is a schematic view of the structure for the second exemplary embodiment of the player shown in the FIG. 1.

FIG. 3 shows a schematic view of the structure for the second exemplary embodiment of the invention. The player 30 contains a reading device 21, a network communication device 22, a decoding device 23, an outputting device 24, a buffering device 25, a bandwidth detecting device 26, a selecting device 31, and the other conventional components of the player 30 are not shown in the FIG. 1.

The player 30 shown in the FIG. 3 can implement the playback functions in the following two way:

Example 1

In the example 1, the quality selecting menu of the content requiring downloading is stored in the OPTICAL DISK. Then, information read out by the reading device 21 includes the content stored on the OPTICAL DISK and required to be played, the ID of OPTICAL DISK, the URL corresponding to the content requiring downloading and the quality selecting menu of content requiring downloading, the quality selecting menu is the same as descried in the first embodiment.

The bandwidth detecting device 26 is used for the detection of the current bandwidth in real-time (as descried in the first embodiment), and transfers the bandwidth to the selecting device 31. And there is corresponding API (application interface) stored in the selecting device 31.

The network communication device 22 comprises a sending device 27 and a receiving device 28. The quality selecting menu from the reading device 21 may be output to the selecting device 31 through the network communication device 22. Then, the selecting device 31 selects from the quality selecting menu of content requiring downloading the quality in conformance with the current bandwidth and sends the selected quality to the network communication device 22.

The sending device 27 of the network communication device 22 sends the downloading request to the network server 60 (shown in FIG. 1), which includes the ID of OPTICAL DISK, the URL corresponding to the content requiring downloading and the quality for downloading content. Therefore, the network server can send the content required to the player according to the downloading requests, which has the quality suitable to the current bandwidth.

The function of the bandwidth detecting device 26 and the selecting device 31 can be implemented through a processor of the conventional OPTICAL DISK player.

Example 2

In the example 2, the quality selecting menu of the content requiring downloading is stored in the network server, not in the OPTICAL DISK. In this case, the bandwidth detecting device 26 transfers the detected bandwidth information to the selecting device 31. The sending device 27 of the network communication device 22 transfers the request to the network server to download the quality menu, which request includes the ID of OPTICAL DISK and the URL corresponding to the content requiring downloading.

After the network server has received the downloading request, it transfers to the network communication device 22 all the quality selecting menus of the content requiring downloading. The network communication device 22 transfers the received quality selecting menu to the selecting device 31. The selecting device 31 selects the quality in conformance with this bandwidth from the current quality menu of the content requiring downloading according to the current bandwidth detected by the bandwidth detecting device 26.

The sending device 27 of the network communication device 22 sends again a downloading request, which includes the ID of OPTICAL DISK, the URL corresponding to the content requiring downloading and the quality for downloading content. Therefore, the network server can send the required content to the player according the downloading request, the content has the quality suitable to the current bandwidth.

The player 30 in the second embodiment of the invention not only can detect the current network connection bandwidth in real time, but also can select dynamically the relevant quality required for downloading according to the bandwidth and send the quality to the network server. Therefore, the player can receive downloaded content with appropriate quality in order to improve the playing efficiency.

Figure 4:
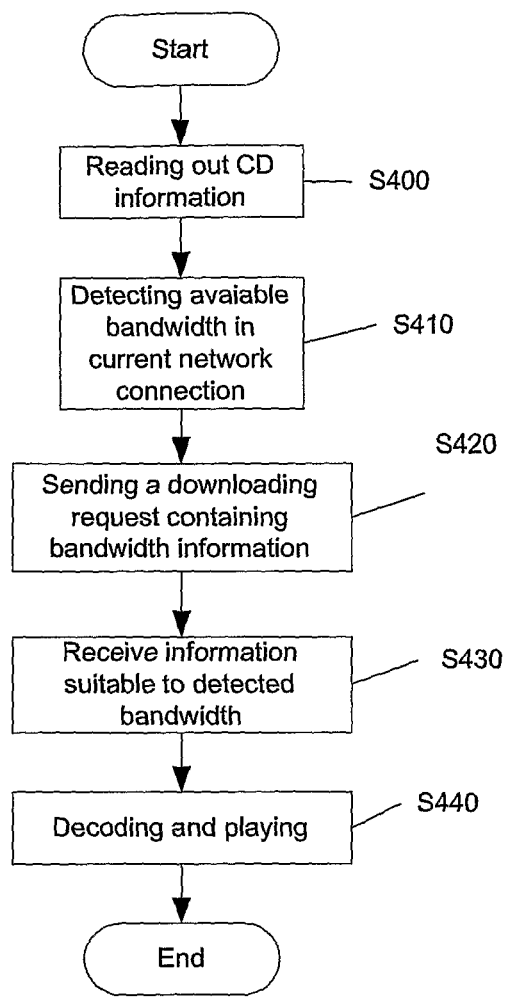
FIG. 4 is a flow diagram illustrating the process the player of the FIG. 2 plays OPTICAL DISK.

FIG. 4 is a flow diagram illustrating the playing process according to the first embodiment of the invention. Firstly, the OPTICAL DISK information is read out (Step S400), which includes the content stored in the OPTICAL DISK and needed to be played, the ID of OPTICAL DISK and the URL corresponding to the content requiring downloading, etc. Then the current available network connection bandwidth is detected in real-time (Step S410), that is to detect the available information transmitted from the network server within a special period (for example per second). This step is carried out in the whole process of the OPTICAL DISK playback.

Then, a downloading request is sent to the network sever to request to download the content cooperating in the OPTICAL DISK playback, which request includes the ID of OPTICAL DISK, the URL of the content requiring downloading and the current network bandwidth information (Step S420).

Then, receiving the content requiring downloading and sent back by the network server (step S430). The received downloaded content is found with corresponding quality by the network server according to the current network connection bandwidth.

Finally, decoding the downloaded information and the playing information read out from OPTICAL DISK to implement seamless playback (step S440).

Figure 5:
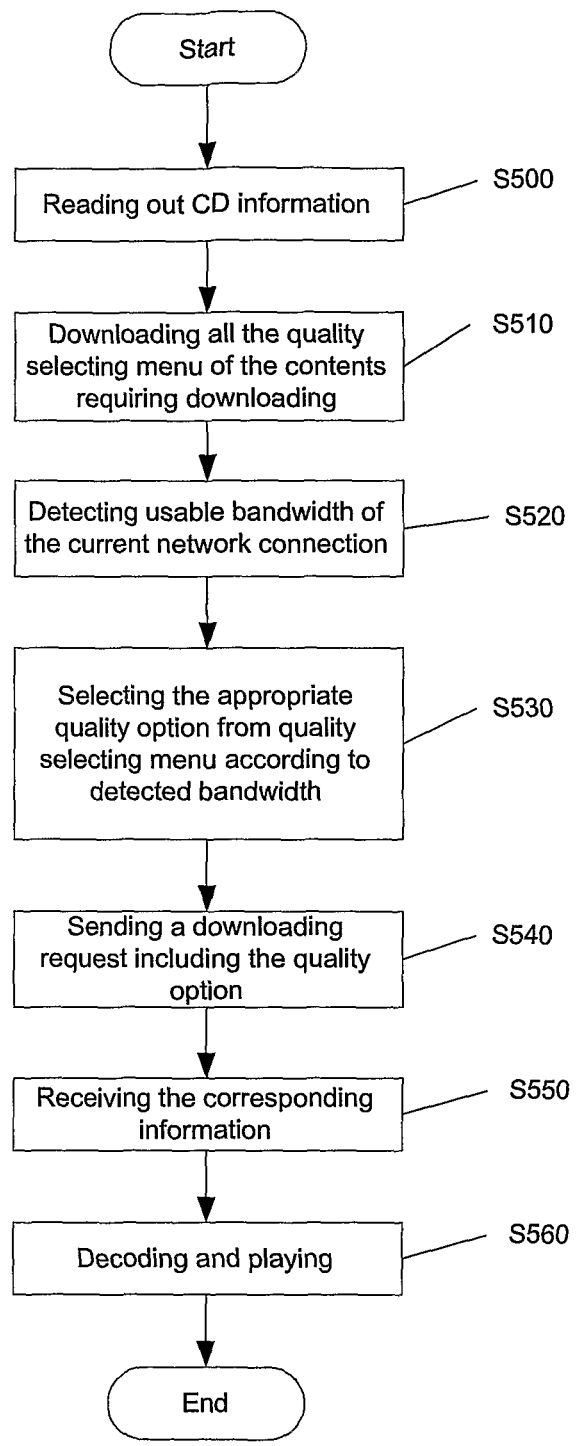
FIG. 5 is a flow diagram illustrating the process the player of the FIG. 3 plays OPTICAL DISK.

FIG. 5 is a flow diagram illustrating the playing process according to another embodiment of the invention. First, it reads OPTICAL DISK information including the content stored in the OPTICAL DISK and required to be played, the ID of OPTICAL DISK and the corresponding URL of the content requiring downloading (step 550).

Then, a downloading request is sent to the network server to request downloading all the quality selecting menu of the content requiring downloading, which request includes the ID of OPTICAL DISK and the URL, etc (step S510). However, if all the quality selecting menu of the content requiring downloading are per-stored in the OPTICAL DISK, then the OPTICAL DISK information read out in the step S500 can also include the quality menu, so the step S510 can be omitted.

Thereafter, the current network connection bandwidth is detected in real-time (step S520). The step is similar to the step S410 in FIG. 4. According to the detected current network connection bandwidth, the corresponding quality option is selected from the received quality menu of the content requiring downloading (step S530).

Next, a downloading request is sent (step S540) to request to download the information for cooperating in the OPTICAL DISK playback, which downloading request includes the ID of OPTICAL DISK, the URL of the content requiring downloading and the quality option of the content requiring downloading.

Finally, the information corresponding to the downloading request content is received (step S550), and the downloaded information and the corresponding information in the OPTICAL DISK is decoded in order to implement seamless playback. (step S560).

Because the invention adopts the automatic real time dynamical detection of the current available bandwidth to select automatically the quality of content requiring downloading, the OPTICAL DISK player and playing method of the invention can realize seamless playback while avoiding the trouble and error which may be caused by the user when he selects the quality himself.

In addition, the device and method for detecting the network connection bandwidth in real-time disclosed by the present invention may also apply to others fields, such as networked PC (Personal Computer) and networked mobile phone, etc.

Although the present invention has been described combined with specific embodiments, it will be apparent to those skilled in the art that many substitutions, modification and variation can be made according to the above description. Thus, it is intended that the present invention include all those substitutions, modification and variation that fall in the spirit and scope of the appended claims.

What is claimed is:

1. A method, operable in a processing system, for playing a content available for downloading, the method comprising:
    reading, by a reading device, a pre-stored content from an optical storage device connected to said processing system, said pre-stored content providing additional information regarding said content available for downloading, the pre-stored content including at least a quality menu of the content available for downloading wherein the quality menu includes a plurality of quality options associated with different bandwidth related rendering qualities associated with the content available for downloading, said quality options being independent of rendering capabilities of said processing system;
    detecting, by a bandwidth detecting device, an available bandwidth based on an available information received in a buffering device within said processing system;
    sending, by a sending device, a request for downloading the content available for downloading according to the additional information regarding the content available for downloading, wherein the request includes information of the detected available bandwidth;
    selecting a relevant quality from the plurality of quality options for downloading the content available for downloading from the quality menu associated with the content available for downloading, the selected relevant quality being based solely on the detected available bandwidth;
    receiving, by a receiving device, the content available for downloading according to the selected quality associated with the detected bandwidth in said buffering device within said processing system;
    playing, on an output device, the content available for downloading combined with the pre-stored content cooperatively to provide seamless playback of said downloaded content with the pre-stored content;
    detecting, by the bandwidth detecting device, an available bandwidth based on an amount of the received content received in said buffering device while said previously received content with said pre-stored data is played;
    selecting a quality from the plurality of quality options within said quality menu, said selected quality being based solely on the monitored available bandwidth; and
    sending, by the sending device, a request with the selected quality for playing the content available for downloading with the pre-stored content cooperatively to provide seamless playback, on the output device, of said downloaded content with the pre-stored content.

2. The method of claim 1, wherein the request comprises at least one of the group of: an ID of the optical storage disk; and a URL of a website on which the content available for downloading is stored.

3. The method of claim 1, wherein the detecting, detects throughput of effective information transmitted within a specific period.

4. A method for playing a content available for downloading, on a processing system, the method comprising the acts of:
    reading, by a reading device, a pre-stored content from an optical storage device connected to said processing system associated with the processing system, said pre-stored content providing additional information regarding said content available for downloading, the additional information including at least a quality menu of the content available for downloading, wherein the quality menu includes a plurality of quality options associated with different bandwidth related rendering qualities associated with the content available for downloading, said quality options being independent of rendering capabilities of said processing system;
    detecting, by a bandwidth detecting device, an available bandwidth based on an available information received in a buffer device within the processing system;
    selecting a relevant quality of the content available for downloading according to the detected bandwidth information from the plurality of quality options of the quality menu and the additional information regarding the content available for downloading, the relevant quality being selected based solely on the detected available bandwidth;
    sending, by a sending device, a request for downloading the content available for downloading according to the information relevant to the content available for downloading, wherein the request includes the relevant quality;
    receiving, by a receiving device, the content available for downloading according to the relevant quality in said buffer device within the processing system;
    playing, at an outputting device, the content available for downloading combined with the pre-stored content cooperatively to provide seamless playback of said downloaded content with the pre-stored content; and
    detecting, by the bandwidth detecting device, an available bandwidth, based on an amount of the received content received in said buffer device within said processing system while said previously received content with said pre-stored content is played, to select a quality from the plurality of quality options within said quality menu, said quality being based solely on the monitored available bandwidth for playing the content available for downloading with the pre-stored content cooperatively to provide seamless playback, at said outputting device, of said downloaded content with the pre-stored content.

5. The method of claim 4, wherein the additional information regarding the content available for downloading comprises at least one of the group of: an ID of the optical storage device; and a URL of a website on which the content available for downloading is stored.

6. The method of claim 4, wherein the detecting, detects throughput of effective information transmitted within a specific period.

7. A method for playing a content available for downloading on a processing system, the method comprising:
    reading, by a reading device, a pre-stored content stored on an optical storage device-connected to said processing system, the pre-stored content includes information regarding the content available for downloading, the pre-stored content including at least a quality menu of the content available for downloading wherein the quality menu includes a plurality of quality options associated with different bandwidth related rendering qualities associated with the content available for downloading, said quality options being independent of rendering capabilities of a system for playing the content, said pre-stored content being stored on a local storage medium;

detecting, by a bandwidth detecting device, an available bandwidth based on an amount of the received content received in a buffer within a processing system;

selecting, based solely on the detected available bandwidth from the plurality of quality options within said quality menu, a relevant quality of the content available for downloading according to the detected bandwidth information and the information regarding the content of the content available for downloading;

sending, by a sending device, a request for downloading the content available for downloading according to the information regarding the content of the downloaded content, wherein the request includes the relevant quality;

receiving, by a receiving device, the content available for downloading according to the relevant quality in said buffer within the processing system;

playing, at an outputting device, the content available for downloading combined with the pre-stored content of the content available for downloading cooperatively to provide seamless playback of said downloaded content with the pre-stored content; and detecting, by the bandwidth detecting device, an available bandwidth to select, based solely on the monitored available bandwidth, a quality from the plurality of quality options within said quality menu for playing the combined content available for downloading and the pre-stored content cooperatively to provide seamless playback of said downloaded content with the pre-stored content, at the outputting device, wherein said available bandwidth is determined based on an amount of content received in said buffer while said previously received content with said pre-stored content is played.

8. The method of claim 7, wherein the information regarding the content of the content available for downloading comprises at least one of a group of: an ID of the optical storage device; and a URL of a website on which the content available for downloading is stored.

9. The method claim 7, wherein the detecting, detects throughput of effective information transmitted within a specific period.

10. A processing device for playing a content available for downloading, the processing device comprising:

a reading device for reading a pre-stored content, from an optical storage device connected to said processing device, said pre-stored content including information regarding the content available for downloading, the pre-stored content including at least a quality menu of the content available for downloading wherein the quality menu includes a plurality of quality options associated with different bandwidth related rendering qualities associated with the content available for downloading, said quality options being independent of rendering capabilities of the device;

a detecting device for detecting an available bandwidth based on an available information received in a buffer within said device;

a sending device for sending a request for downloading the content available for downloading according to the information contained within the pre-stored content, wherein the request includes the information of the available bandwidth;

a receiving device for receiving, in said buffer, the content available for downloading according to a quality selected from the plurality of quality options within said quality menu based solely on the detected bandwidth;

a playing device for playing the content available for downloading combined with the pre-stored content, wherein said downloaded content with the pre-stored content are played seamlessly; and a detecting device for monitoring an available bandwidth, based on amount of content received in said buffer, while previously received content with said pre-stored content is being played, to select a quality, based solely on the detecting available bandwidth from the plurality of quality options within said quality menu, for playing the combined content available for downloading and the pre-stored content cooperatively to provide seamless playback of said downloaded content with the pre-stored content at said processing device.

11. The device of claim 10, wherein the request comprises at least one of the group of: an ID of an optical disk; and a URL of a website on which the content available for downloading is stored.

12. The device of claim 10, wherein the detecting device is arranged for detecting throughput of effective information transmitted within a specific period.

13. A processing device for playing a content available for downloading, comprising:

a reading device for reading a pre-stored content from a storage device connected to said processing device, the pre-stored content including information regarding the content available for downloading, the pre-stored content including at least a quality menu of the content available for downloading, wherein the quality menu includes a plurality of quality options associated with different bandwidth related rendering qualities associated with the content available for downloading, said quality options being independent of rendering capabilities of the device;

a detecting means for detecting available bandwidth based on an available information received in a buffer within said device;

a selecting device for selecting a relevant quality of the content available for downloading according to the detected available bandwidth and the information regarding the content available for downloading, the relevant quality being selected based solely on the detected available bandwidth;

a sending device for sending a request for downloading the content available for downloading according to the information relevant to the downloaded content, wherein the request includes the relevant quality;

a receiving device for receiving, in said buffer, the content available for downloading according to the relevant quality;

a playing device for seamlessly playing the content available for downloading combined with the pre-stored content; and a monitoring device for monitoring an available bandwidth based on an amount of the received content received in said buffer, while previously received content is being played with the pre-stored content, to select a relevant quality, based solely on the detected available bandwidth from the plurality of quality options within said quality menu, for playing the content available for downloading and the pre-stored content cooperatively provide seamless playback of said downloaded content with the pre-stored content.

14. The device of claim 13, wherein the information relevant to the content available for downloading comprises at least one of the group of: an ID of an optical disk, a URL of a website on which the content available for downloading is stored and the quality menu.

15. The device of claim 13, wherein the detecting device is arranged for detecting throughput of effective information transmitted within a specific period.

16. A device for playing a content available for downloading, the device comprising:
 a reading device for reading a pre-stored content, stored in a storage device connected to the device, said pre-stored content including information regarding the content available for downloading, the pre-stored content including at least a quality menu of the content available for downloading, wherein the quality menu includes a plurality of quality options associated with different bandwidth related rendering qualities associated with the content available for downloading, said quality options being independent of rendering capabilities of the device;
 a detecting device for detecting an available bandwidth based on amount of data received in a buffer in said device;
 a selecting means for selecting a relevant quality based solely on the monitored available bandwidth from the plurality of quality options within said quality menu;
 a sending means for sending a request for downloading the content available for downloading according to the information relevant to the content available for downloading, wherein the request includes the relevant quality;
 a receiving device for receiving the content available for downloading, in said buffer, according to the relevant quality;
 a playing device for seamlessly playing the content available for downloading combined with the pre-stored content; and
 a monitoring device for monitoring an available bandwidth based on an amount of the received content received in said buffer, while said previously received content with said pre-stored content is played, to select a quality, based solely on the monitored available bandwidth, from the plurality of quality options within said quality menu for playing the content available for downloading and the pre-stored content cooperatively to provide seamless playback of said downloaded content with the pre-stored content on said playing device.

17. The device of claim 16, wherein the information relevant to the content available for downloading comprises at least one of the group of: an ID of an optical disk and a URL of a website on which the content for downloading is stored.

18. The device of claim 17, wherein the detecting device is arranged for detecting throughput of effective information transmitted within a specific period.

19. A tangible computer readable storage medium that is not a transitory propagating signal or wave, the medium being modified with control information including instructions for performing a method for playing a content available for downloading, said method causing a processor system to:
 read a pre-stored content from an optical storage device connected to said processor system, said pre-stored content providing additional information regarding said content available for downloading, the pre-stored content including at least a quality menu of the content available for downloading wherein the quality menu includes a plurality of quality options associated with different bandwidth related rendering qualities associated with the content available for downloading, said quality options being independent of rendering capabilities of said processing system;
 detect an available bandwidth based on an available information received in a buffering device;
 send a request for downloading the content available for downloading according to the additional information regarding the content available for downloading, wherein the request includes information of the detected available bandwidth;
 select a relevant quality from the plurality of quality options for downloading the content available for downloading from the quality menu associated with the content available for downloading, the selected relevant quality being based solely on the detected available bandwidth;
 receive the content available for downloading according to the selected quality associated with the detected bandwidth in said buffering device;
 play the content available for downloading combined with the pre-stored content cooperatively to provide seamless playback of said downloaded content with the pre-stored content;
 monitor the received content and determine an available bandwidth based on an amount of the received content received in said buffering device while said previously received content with said pre-stored data is played;
 select a quality from the plurality of quality options within said quality menu, said selected quality being based solely on the monitored available bandwidth; and
 send a request with the selected quality for playing the content available for downloading with the pre-stored content cooperatively provide seamless playback of said downloaded content with the pre-stored content.

20. The device of claim 19, wherein the information relevant to the content available for downloading comprises at least one of the group of: an ID of the optical storage medium a URL of a website on which the content available for downloading is stored and the quality menu.

* * * * *